United States Patent [19]

Fox et al.

[11] 4,293,452
[45] Oct. 6, 1981

[54] ELECTRICALLY CONDUCTIVE POLYMERIC COMPOSITIONS

[75] Inventors: Robert B. Fox, Washington, D.C.; Oh-Kil Kim, Burke, Va.

[73] Assignee: The United States of America as represented by the Secretary of the Navy, Washington, D.C.

[21] Appl. No.: 117,162

[22] Filed: Jan. 31, 1980

[51] Int. Cl.³ .............................................. H01B 1/06
[52] U.S. Cl. .................................. 252/518; 252/511; 252/521
[58] Field of Search ............... 252/518, 521, 512, 511; 260/37 R, 37 PC, 42; 526/4, 6; 338/13, 22 R, 22 SD; 357/7

[56] References Cited

U.S. PATENT DOCUMENTS

| | | | |
|---|---|---|---|
| 3,155,631 | 11/1964 | Zapp | 252/511 |
| 3,326,863 | 6/1967 | Talcum et al. | 252/511 |
| 3,373,075 | 3/1968 | Keenan et al. | 252/511 |
| 3,510,448 | 5/1970 | Byler et al. | 252/511 |
| 4,064,075 | 12/1977 | Hull | 252/511 |

Primary Examiner—J. L. Barr
Attorney, Agent, or Firm—R. S. Sciascia; A. L. Branning; T. E. McDonnell

[57] ABSTRACT

Electrically conductive polymeric compositions are obtained by incorporating crown ether complexes of TCNQ salts in a polymer selected from the class consisting of polycarbonates and poly(alkyl alkacrylates). The compositions can be formed into semiconductive films useful in the fabrication of e.g. thermoresistors and electronic devices.

7 Claims, No Drawings

ELECTRICALLY CONDUCTIVE POLYMERIC COMPOSITIONS

BACKGROUND OF THE INVENTION

The present invention pertains generally to electroactive materials and in particular to organic polymeric conductive materials.

Presently, numerous metals and other inorganic substances are used to fabricate electrical conductors, semiconductors, electronic devices, and electromagnetic or acoustic sensors. The utility of these materials is frequently limited by such factors as weight, mechanical fragility, fabrication problems, corrosion, scarcity, and high costs.

Many organic materials have properties which overcome or minimize these problems, and possess several other advantages, such as ease of fabrication into films, filaments, and complex shapes and variability in molecular design. Of particular importance is the possibility with organic materials to fabricate electronic devices whose dimensions are "molecular", such as diodes, capacitors, and gates whose dimensions are in the range of 10 Å to 500 Å.

Numerous resinous compositions that conduct electricity are known. Many of them comprise an organic resin with a conductive material, e.g., a metal or graphite, dispersed in the resin. Due to a lack of chemical bonding and the discreteness of the conductive filler, the mechanical properties are not good and loading the polymeric binder with sufficient filler to produce a polymeric conductor with sufficient conductivity to meet the requirements of many applications is often not possible. Further, metallic corrosion can deteriorate the conductivity of the composition. Metals and graphite are not transparent and their inclusion prevents the fabrication of a transparent conductor. An organic compound whose salts and complexes have excellent semiconductivity is 7,7,8,8-tetracyano-p-quinodimethane (TCNQ). Unfortunately it is not polymerizable and is not compatible with any known resin, which prevents its homogenous dispersion in a polymeric resin.

SUMMARY OF THE INVENTION

It is, therefore, an object of the present invention to provide a class of electrically semiconductive organic materials.

A further object of the present invention is to provide a class of materials that combine the useful electrical properties of semiconductors with the physical and mechanical properties of thermoplastic organic polymers.

A still further object is to provide transparent, flexible, moldable, and easily processable semiconductors.

These and other objects are achieved by increasing the solubility of electrically conductive salts of TCNQ in a polymeric binder by complexing them with macrocyclic compounds, thereby permitting a heavy loading of the binder.

DETAILED DESCRIPTION OF THE INVENTION

The salts of 7,7,8,8-tetracyanoquinodimethane (TCNQ) that are electrically conductive and useable in the practice of the present invention are the lithium, sodium, potassium, rubidium, cesium, calcium, strontium, and barium salts. Preferably the lithium, sodium or potassium salts are used. The salts can be prepared by any of the usual methods, e.g., L. R. Melby et. al. in J. Am. Chem. Soc. 84, 3374 (1962).

The TCNQ salts can form complexes with a large variety of heterocyclic macrocyclic compounds through association between the cation of the salt and the macrocycle. The requirements of electrical conductivity and compatability with a polymeric binder limit the macrocyclic compounds to monocyclic structures containing only oxyethylene groups in the ring and having hydrocarbon substituents. By monocyclic, it is meant that the oxyethylene groups only form a single ring and is not meant to exclude pendant ring structures. Hence, the monocyclic structures consist of a sequence of oxyethylene units in which the ends of the sequence are connected to each other; one or more of the oxyethylene units may be substituted or form part of a smaller ring structure.

The macrocycles can be represented by the formula: $(OA)_x$, wherein x is an integer from 4 to 10 and preferably 6 or 8 and A is a bivalent hydrocarbon radical having from 2 to 8 carbon atoms in which the free valences are separated by 2 carbon atoms. These macrocycles are commonly referred to as crown ethers. The following are examples of suitable macrocycles:

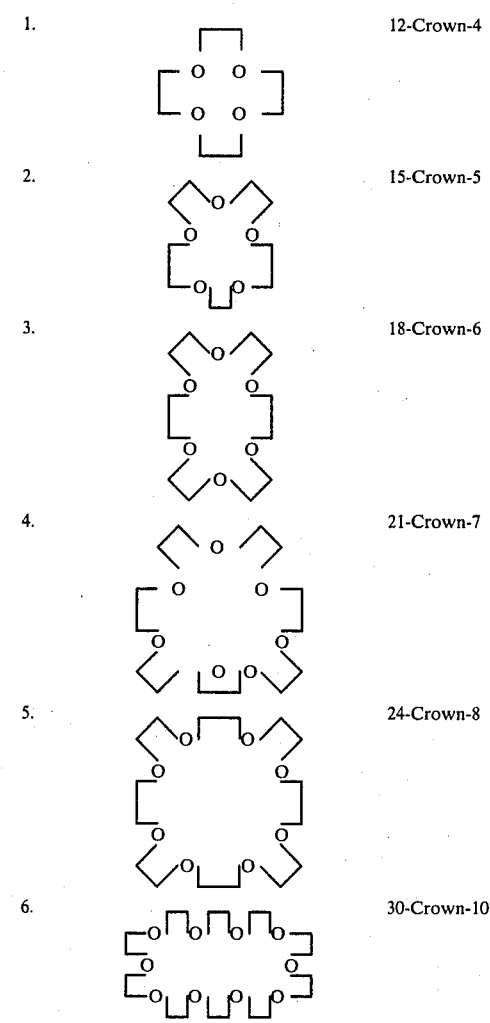

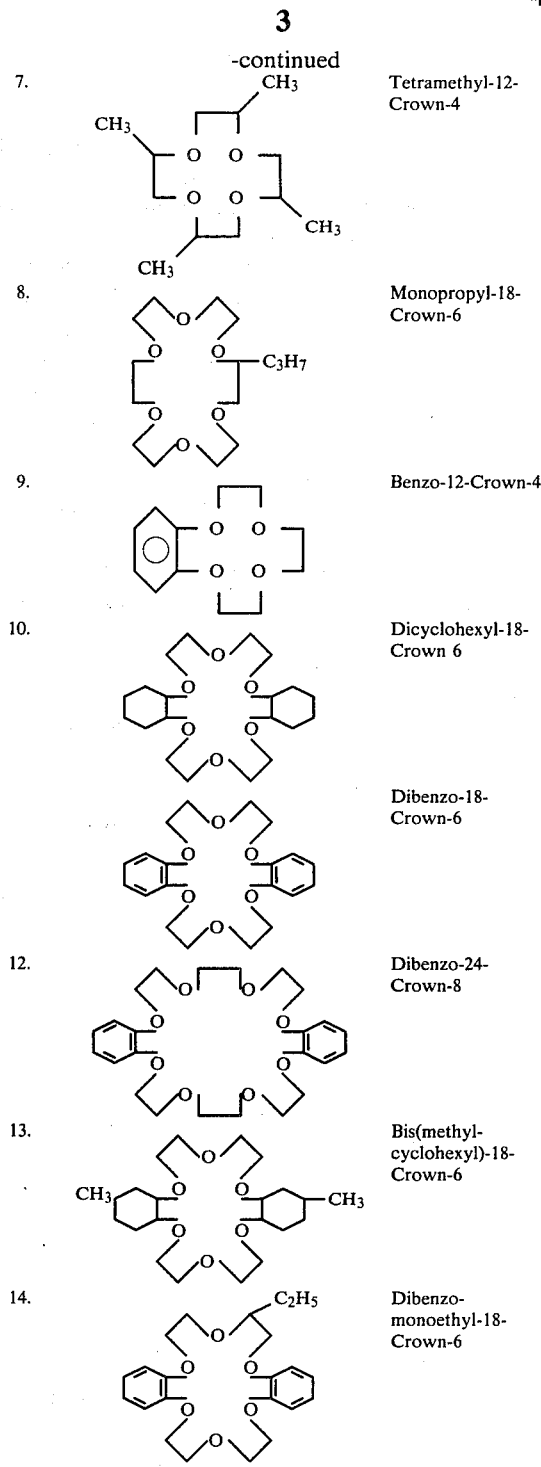

| | |
|---|---|
| 7. | Tetramethyl-12-Crown-4 |
| 8. | Monopropyl-18-Crown-6 |
| 9. | Benzo-12-Crown-4 |
| 10. | Dicyclohexyl-18-Crown 6 |
| | Dibenzo-18-Crown-6 |
| 12. | Dibenzo-24-Crown-8 |
| 13. | Bis(methylcyclohexyl)-18-Crown-6 |
| 14. | Dibenzo-monoethyl-18-Crown-6 |

Additional examples of these compounds are found in J. J. Christensen, Chem. Rev. 74(3): p. 351-84. 1974. The preferred compounds are numbers 2 to 5 and 10 to 12.

The macrocycles can form two types of crowned salt complexes, represented by the formulae $[(QA)_x.M]^{m+}[TCN\bar{Q}][TCNQ]_n°$ wherein $(OA)_x$ represents one of the above macrocycles, M is defined as before, m is 1 or 2, and n is 0 or 1.

The crowned simple salt has n equal to zero, reducing the formula to: $[(OA).M]^{m+}[TCN\bar{Q}]_m$. This salt can be formed by mixing a TCNQ salt with one of the above crown ethers compound in a solvent at a temperature from 0° to 100° C. Suitable solvents include ethanol, methylene chloride, and acetonitrile. It is preferred that an excess of crown ether up to 20 weight percent be used. The reaction takes place in a few minutes, and the product is recovered by evaporation of the solvent.

The crowned complex salt is represented by the formula $[(OA)_x.M]^{+m}[TCN\bar{Q}]_m[TCNQ]$ where $(OA)_x$, M, and m are defined as before. This complex can be formed by mixing the uncrowned simple salt, $M^{m+}[TCN\bar{Q}]$ TCNQ°, and crown ether in a suitable solvent and recovering the product by evaporation of the solvent. The complex can also be formed from the crowned simple salt and TCNQ in a suitable solvent.

The electrically conductive polymeric composition of the present invention is obtained by the evaporation of a solution containing the matrix binder and a crowned salt. It also is possible to mix the salt and crown ether into the polymer solution, thereby forming and dispersing the salt complex in one step. The polymeric binder is selected from the class consisting of polycarbonate and poly(alkyl alkacrylate) wherein the alkyl radicals have from 1 to 10 carbon atoms, preferably from 1 to 4 carbon atoms, and most preferably 1 to 2 carbon atoms. Any non-reactive solvent may be used for example, dichloroethane or methylene chloride. It is preferred to maximize the amount of crowned salt. Presently, loadings of the crowned salt as high as 12 weight percent have been achieved. The minimum amount of salt complex that would produce a useable material is about 2 weight percent.

The following examples are given by way of explanation and are not meant to limit this disclosure or the claims to follow.

EXAMPLE I

Preparation of $K^+(TCN\bar{Q})(TCNQ°)$

A mixture of 204 mg (1 mmol) of TCNQ and 243 mg (1 mmol) of $K^{30}TCN\bar{Q}$ (prepared by methods of Melby et. al., JACS 84. 3374 (1962) in 25 ml of acetone was refluxed one hour, cooled, and filtered to give 313 mg of purple crystals, mp>300°, the infrared spectrum of which shows a strong band at 862 cm$^{-1}$, not present in K+TCNQ but present in TCNQ itself; chemical analysis agrees with $K^+(TCNQ)(TCNQ°)$.

EXAMPLE II

Preparation of $(18$-Crown-$6.K)^+TCNQ^-$

A mixture of 122 mg (0.5 mmol) of $K^+TCN\bar{Q}$ and 264 mg (1 mmol) of 18-Crown-6 in 5 ml of dichloroethane was refluxed 15 min. and allowed to stand for 16 hours at room temperature. Filtration gave 243 mg of purple-blue crystals, mp 200°-202°, whose analysis and infrared spectra were consistent with the expected product.

EXAMPLE III

Preparation of $(18$-Crown-$6.K)^{30}(TCN\bar{Q})(TCNQ°)$

To a stirred mixture of 122 mg (0.5 mmol) of $K^+TCNQ$ and 264 mg (1 mmol) of 18-Crown-6 in 10 ml of dichloroethane was added, all at once, a hot solution of 142 mg (0.5 mmol) of TCNQ in 40 ml of dichloroethane. After refluxing 30 min. and cooling for 2 hours, there was obtained 335 mg of black needles, mp. 260°-264°. The product, after recrystallization from acetonitrile, had an analysis, infrared spectrum, and ultraviolet spectrum that agreed with that of the expected $(18$-Crown-$6K)^+(TCN\bar{Q})(TCNQ°)$.

EXAMPLE IV

Preparation of (18-Crown-6.K)+(TCNQ̇) (TCNQ°)

A product identical to that of Example III was prepared by refluxing for 15 min. a mixture of equimolar quantities of TCNQ and (18-Crown-6.K)+(TCNQ̇) (Example II) in dichloroethane.

EXAMPLE V

Preparation of Polymer Films Containing TCNQ Salts

A stock solution of commercial poly(methyl methacrylate) (PMMA) in dichloroethane containing 100 mg. PMMA per milliliter of solution was prepared. From 1 ml samples of this solution, the following mixtures were prepared by adding:
(a) 1 mg. K+(TCNQ̇) (TCNQ°)
(b) 6 mg. K+(TCNQ̇) (TCNQ°)
(c) 6 mg. K+(TCNQ̇) (TCNQ°) plus 6 mg. 18-Crown-6
(d) 1 mg. (18-Crown-6.K)+(TCNQ̇) (TCNQ°) plus 1 mg 18-Crown-6
(e) 3 mg. (18-Crown-6.K)+(TCNQ̇) (TCNQ°) plus 3 mg. 18-Crown 6
(f) 6 mg. (18-Crown-6.K)+(TCNQ̇) (TCNQ°) plus 6 mg. 18-Crown-6. The salt in mixtures (a) and (b) was insoluble. In the case of mixtures (c)-(f), clear green solutions were obtained. Films from each of these mixtures were formed by evaporation at room temperature (22° C.) over a period of 24 hours and traces of residual solvent were removed in vacuo. The films from (a) and (b) were faintly green with clumps of suspended solids; there was little evidence of solubility of the salt in the polymer. A transparent green film was obtained from mixture (d); the green films from (e) contained widely scattered clusters of blue needles, while those from (c) and (f) had overlapping clusters of needles homogenously distributed through the polymer. Immersion of these films in water over a period of several days did not change their appearance.

EXAMPLE VI

Electrical Conductivity of PMMA Films Containing TCNQ Salts

Initially, the films of Example V were electrically unstable. Application of the electric field tended to produce dark currents that varied with time, suggesting detrapping of charge carriers. Repeated application of the field, however, eventually resulted in stable and reproducible dark currents in films containing the crowned salt; stabilization was achieved more rapidly if excess crown ether was present. Stabilization was not achieved in films containing uncrowned salt. In Table I are given the estimated dark conductivities at 5000 V $cm^{-1}$ observed for these films of Example V.

TABLE I

| | System | | Conductivity $(\Omega^{-1}cm^{-1})$ at 500 V $cm^{-1}$ | |
|---|---|---|---|---|
| | | | Initial | Stabilized |
| (a) | Uncrowned Salt | 1% | $10^{-8}$ | (no) |
| (b) | Uncrowned Salt | 6% | $10^{-8}$ | (no) |
| (c) | Uncrowned Salt, plus Crown ether | 6% 6% | $10^{-5}$ | $10^{-6}$ |
| (d) | Crowned Salt plus Crown | 1% | $10^{-10}$ | — |
| (e) | Crowned Salt plus Crown | 3% | $10^{-7}$ | $10^{-8}$ |
| (f) | Crowned Salt plus Crown | 6% | $10^{-5}$ | $10^{-7}$ |

It is immediately apparent from these results that conductivity of the uncrowned salt is enhanced by the incorporation of the crown ether and that excess crown ether does not grossly change this conductivity. It is also clear that conductivity is not a simple function of solubility in the crown systems, since crystalline material was present in the films at the 3% and 6% levels.

EXAMPLE VII

The solutions of Example V were prepared, substituting polycarbonate for poly(methyl methacrylate), and films were obtained in the same manner. The appearance and electrical behavior of these films were identical to those of the poly (methyl methacrylate) films.

EXAMPLE VIII

Preparation of Additional PMMA Films Containing TCNQ SAlts

A stock solution of commercial poly (methyl methacrylate) (PMMA) in dichloroethane containing 100 mg PMMA per milliliter of solution was prepared. The following solutions were prepared by adding:

a. 12.2 mg K+TCNQ̇: 10.4 mg TCNQ: 18.6 mg dicyclohexyl-18-Crown-6
b. 12.2 mg K+TCNQ̇: 10.4 mg TCNQ: 20 mg 27-Crown-9
c. 12.2 mg K+TCNQ̇: 10.4 mg TCNQ: 22.6 mg dibenzo-24-Crown-8
d. 10.5 mg Li+TCNQ̇: 10.4 mg TCNQ: 8.8 mg 12-Crown-4

The solutions were clear green and films were easily obtained from the solutions by evaporation at room temperature.

In summary, crown ether complexes of tetracyanoquinodimethane salts have been synthesized. They are found to be more soluble in organic solvents than the salts themselves. Solutions and dispersions of the complex salts in common film-forming polymers, such as poly(methyl methacrylate), provide flexible semiconducting films having conductivities several orders of magnitude greater than those for polymer dispersions of the salts in the absence of crown ethers.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An electrically conductive polymeric composition consisting essentially of a polymer selected from the class consisting of polycarbonates and poly(alkyl alkacrylates) wherein the alkyl radicals have from one to 10 carbons and, dispersed therein, an effective amount of a crown ether complex represented by the formula:

$[(OA)_x\cdot M]^{+m}[TCNQ]_m^{\dot{-}}[TCNQ]_n°$ wherein m is 1 or 2, n is 0 or 1, TCNQ is 7,7,8,8,-tetracyano-p-quinodimethane, M is selected from the group consisting of lithium, sodium, potassium, rubidium, lesium calcium, strontium, and barium, and $(OA)_x$ is a macrocycle wherein x is an integer from 4 to 10, 0 represents oxygen and A is a bivalent hydrocarbon radical having from 2 to 8 carbon atoms in which the free valences are separated by two carbon atoms.

2. The composition of claim 1 wherein M is selected from the class consisting of lithium, potassium, and sodium and m equals 1.

3. The composition of claim 2 wherein the alkyl radicals of said polyl (alkyl alkacrylate) have from 1 to 4 carbon atoms.

4. The composition of claim 2 wherein said poly(alkyl alkacrylate) is poly(methyl methacrylate).

5. The composition of claim 4 wherein x represents an integer from 4 to 8 and A represents a bivalent hydrocarbon having from 2 to 6 carbon atoms.

6. The composition of claim 4 wherein A represents the ethylene radical.

7. The composition of claim 2 wherein n equals 0.

* * * * *